(12) United States Patent
Kobo et al.

(10) Patent No.: US 11,729,139 B2
(45) Date of Patent: Aug. 15, 2023

(54) SYSTEMS AND METHODS FOR THE HANDLING OF BRIDGED VIRTUAL MACHINES

(71) Applicant: Cisco Technology, Inc., San Jose, CA (US)

(72) Inventors: Roberto Mitsuo Kobo, Pleasanton, CA (US); Parthiv Shah, Fremont, CA (US); Ramesh Yeevani-Srinivas, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 17/381,539

(22) Filed: Jul. 21, 2021

(65) Prior Publication Data

US 2023/0034148 A1 Feb. 2, 2023

(51) Int. Cl.
*H04L 12/741* (2013.01)
*H04L 12/721* (2013.01)
*H04L 29/12* (2006.01)
*H04L 61/5014* (2022.01)
*G06F 9/455* (2018.01)
*H04L 101/622* (2022.01)

(52) U.S. Cl.
CPC ...... *H04L 61/5014* (2022.05); *G06F 9/45558* (2013.01); *G06F 2009/45562* (2013.01); *G06F 2009/45595* (2013.01); *H04L 2101/622* (2022.05)

(58) Field of Classification Search
CPC .......... H04L 61/5014; H04L 2101/622; G06F 9/45558; G06F 2009/45562; G06F 2009/45595

USPC ........................................................ 709/245
See application file for complete search history.

(56) References Cited

U.S. PATENT DOCUMENTS

| 7,478,173 | B1 | 1/2009 | Delco | |
|---|---|---|---|---|
| 7,586,912 | B2* | 9/2009 | Agarwal | H04L 61/5014 370/389 |
| 7,873,711 | B2* | 1/2011 | Adams | H04L 61/5046 718/1 |
| 7,984,125 | B2* | 7/2011 | Shaw, Jr | G06F 11/3664 709/222 |
| 9,787,633 | B2* | 10/2017 | Bhagwat | H04L 61/255 |
| 2004/0177133 | A1* | 9/2004 | Harrison | H04L 12/2801 709/230 |

(Continued)

*Primary Examiner* — Kevin T Bates
*Assistant Examiner* — Golam Mahmud
(74) *Attorney, Agent, or Firm* — Meunier Carlin & Curfman LLC

(57) ABSTRACT

A system and method for onboarding a virtual machine in a bridge host extension mode are provided. The method includes: creating a virtual machine on a host computing device, wherein the host computing device is associated with a first MAC address and a first IP address; assigning the virtual machine a second MAC address by the host computing device; receiving a first DHCP packet from the virtual machine by the host computing device, wherein the first DHCP packet comprises a first field that includes the second MAC address; replacing the second MAC address in the first field with the first MAC address by the host computing device; adding the second MAC address to a second field of the first DHCP packet by the host computing device; and providing the first DHCP packet to a DHCP server through a network by the host computing device.

18 Claims, 5 Drawing Sheets

(56) References Cited

U.S. PATENT DOCUMENTS

| | | | |
|---|---|---|---|
| 2007/0203999 A1* | 8/2007 | Townsley | H04L 63/08 709/207 |
| 2008/0080512 A1* | 4/2008 | Gofman | H04L 45/00 370/392 |
| 2009/0113073 A1* | 4/2009 | Koide | H04L 12/4633 709/245 |
| 2014/0040440 A1* | 2/2014 | Christopher | H04L 61/00 709/220 |
| 2014/0297889 A1 | 10/2014 | Dong et al. | |
| 2015/0113168 A1* | 4/2015 | Xu | H04L 12/4625 709/245 |
| 2015/0128245 A1 | 5/2015 | Brown et al. | |
| 2015/0180824 A1 | 6/2015 | Atanasov | |
| 2015/0186174 A1* | 7/2015 | Borkmann | G06F 9/45558 718/1 |
| 2016/0094364 A1 | 3/2016 | Subramaniyam et al. | |
| 2016/0218972 A1* | 7/2016 | Sun | H04L 45/54 |
| 2018/0287938 A1* | 10/2018 | Han | H04L 12/4633 |
| 2019/0097966 A1* | 3/2019 | Hu | H04L 61/5014 |
| 2019/0207821 A1* | 7/2019 | Perkal | H04L 63/123 |
| 2020/0045011 A1* | 2/2020 | Nayak | H04L 61/5046 |
| 2022/0308860 A1* | 9/2022 | Morecroft | G06F 8/61 |

* cited by examiner

SYSTEMS AND METHODS FOR THE HANDLING OF BRIDGED VIRTUAL MACHINES

TECHNICAL FIELD

The present disclosure relates generally to virtual machines in networks and communication systems.

BACKGROUND

Network administrators and other information technology (IT) users increasingly want better visibility and control of the clients in a network. The clients may be physical or virtual. This requires visibility on virtual machines, and for this, they are created in bridge mode with each virtual machine having its own identity (media access control ("MAC") address and Internet Protocol ("IP") address). Conventional security checks and forwarding does not support this behavior.

More particularly, visibility and control of virtual machines require the virtual machines to be created in bridge mode. In a typical implementation, a bridge mode virtual machine has its own layer 2 ("L2") identifier (e.g., MAC address) and it acquires an IP address from a dynamic host configuration protocol ("DHCP") server, similar to the way the host behaves. The packets generated by the virtual machine are bridged by the host. This case is handled normally by the existing L2 networks. The network interface in such a host is provisioned to accept packets destined to any MAC address.

A wireless host with bridged mode virtual machines presents some challenges. A wireless host is the computer hosting one or more virtual machines connected via a wireless network interface controller (NIC). Bridged mode is where each virtual machine is created as an independent client with its own MAC address (VM_MAC). The virtual machine acquires an IP address via the DHCP (from an external DHCP server), and the host provides "bridging functionality" so the model inside host is {bridge+virtual machines}. A wired host behaves like a wired NIC that connects host and virtual machines. The network sees multiple MAC addresses connected to the NIC. Wireless clients cannot program the host NIC to operate in promiscuous mode. As a consequence, the host has to replace the VM_MAC with the host MAC (MAC hiding or MAC proxying), and the network sees only the host MAC.

This introduces some challenges. The wireless interface associates with one client (the host), and the AP/WLC does not see the VM_MAC. The network does not see the VM_MAC, so it cannot be used for forwarding. For DHCP packets, the SRC_MAC is different from the client MAC, so it is difficult to profile the virtual machine as the VM_MAC is not seen. And then if the virtual machine is profiled, it is challenging to perform enforcement because security and identity are primarily MAC based. Because authentication is MAC based, it is challenging to authenticate if the VM MAC cannot be seen.

There is no known solution to address these problems in a distributed manner in the network.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

Figure 1:
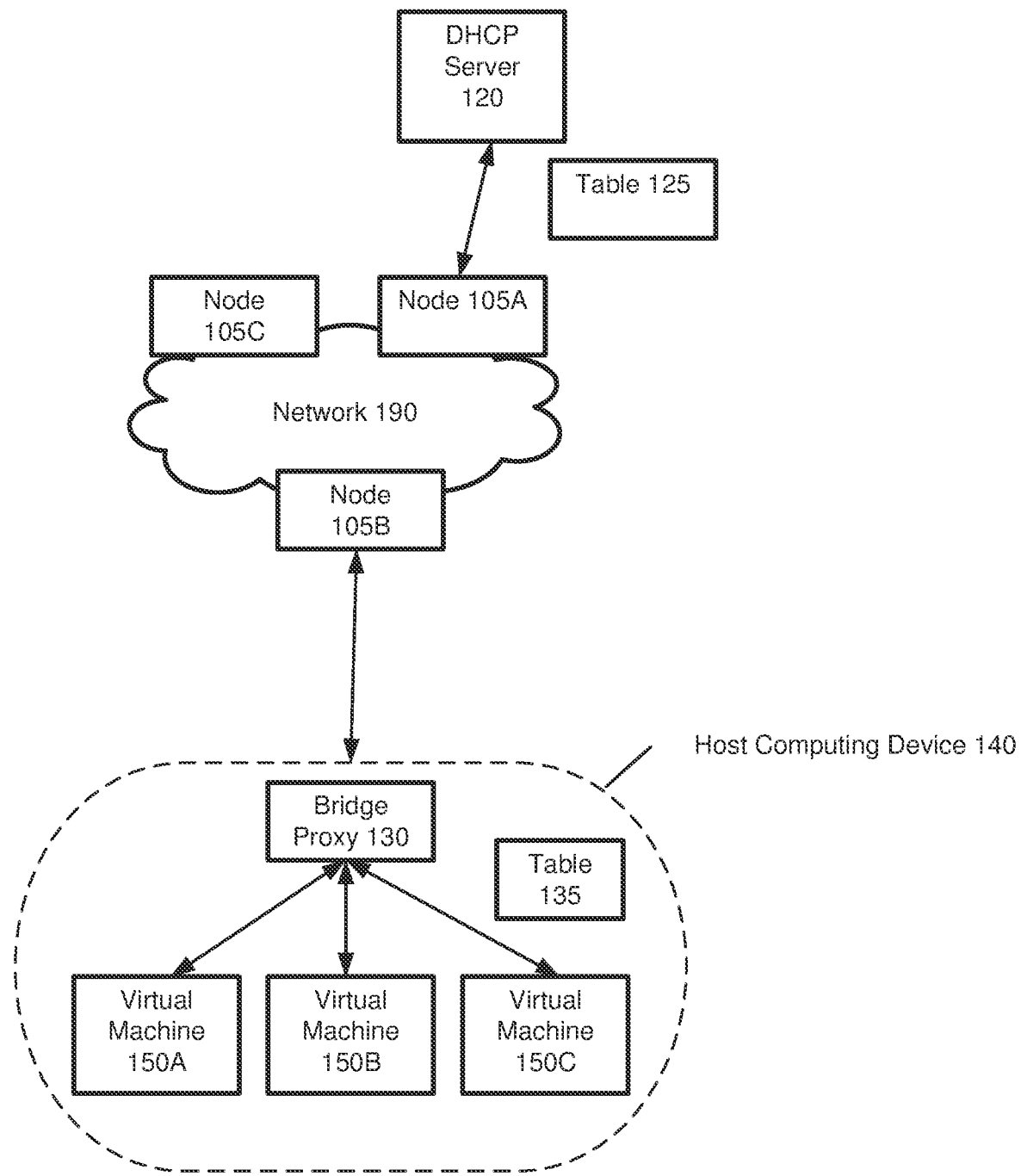
FIG. 1 is an illustration of an example environment for providing a bridge host extension mode for virtual machines.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an embodiment, a method for onboarding a virtual machine in a bridge host extension mode is provided. The method includes: creating a virtual machine on a host computing device, wherein the host computing device is associated with a first MAC address and a first IP address; assigning the virtual machine a second MAC address by the host computing device, wherein the second MAC address is different than the first MAC address; receiving a first DHCP packet from the virtual machine by the host computing device, wherein the first DHCP packet comprises a first field that includes the second MAC address; replacing the second MAC address in the first field with the first MAC address by the host computing device; adding the second MAC address to a second field of the first DHCP packet by the host computing device; and providing the first DHCP packet to a DHCP server through a network by the host computing device.

Embodiments may include some or all of the following features. The method may further include receiving a second DHCP packet from the DHCP server through the network by the host computing device, wherein the second DHCP packet includes a first field with the first MAC address and a second field with the second MAC address; determining that the second DHCP packet is for the virtual machine by the host computing device; in response to the determination, replacing the first MAC address in the first field with the second MAC address by the host computing device; and providing the second DHCP packet to the virtual machine by the host computing device. The second DHCP packet may include a second IP address for the virtual machine. The second IP address may be different than the first IP address. Determining that the second DHCP packet is for the virtual machine may include detecting the second MAC address in the second field. The second DHCP may include an identifier of a bridge host extension mode and determining that the second DHCP packet is for the virtual machine may include detecting the identifier of the bridge host extension mode. The network may include a plurality of edge nodes. The first field may be a destination MAC field. The second field may be a CHADDR field.

In an embodiment, a method for onboarding a virtual machine in a bridge host extension mode is provided. The method includes: receiving a first DHCP packet by a DHCP server from a host computing device through a network, wherein the first DHCP packet comprises a first field that includes a first MAC address of the host computing device and a second MAC address of a virtual machine, and wherein the first MAC address and the second MAC address are different; determining that the first DHCP packet is a request for a first IP address for the virtual machine by the DHCP server; in response to the determination, assigning the first IP address to the virtual machine using the second MAC address, wherein the first IP address is different than a second IP address assigned to the host computing device using the first MAC address; generating a second DHCP packet by the DHCP server, wherein the second DHCP packet includes the first MAC address in a first field, the second MAC address in a second field, and the first IP address; and providing the second DHCP packet to the host computing device by the DHCP server through the network.

Embodiments may include some or all of the following features. The method may further include: receiving the second DHCP packet by the host computing device; determining that the second DHCP packet is for the virtual machine by the host computing device; in response to the determination, replacing the first MAC address in the first field with the second MAC address by the host computing device; and providing the second DHCP packet to the virtual machine by the host computing device. Determining that the second DHCP packet is for the virtual machine may include detecting the second MAC address in the second field. The second DHCP may include an identifier of a bridge host extension mode and determining that the second DHCP packet is for the virtual machine comprises detecting the identifier of the bridge host extension mode. The network may include a plurality of edge nodes. The first field may be a destination MAC field. The second field may be a CHADDR field. The method may include storing the first and second MAC addresses by the DHCP server. The method may further include using the stored first and second MAC addresses to profile the virtual machine.

In an embodiment, a system for onboarding a virtual machine in a bridge host extension mode is provided. The system includes a network of a plurality of edge nodes; a DHCP server; and a host computing device. The host computing device is adapted to: create a virtual machine, wherein the host computing device is associated with a first MAC address and a first IP address; assign the virtual machine a second MAC address, wherein the second MAC address is different than the first MAC address; receive a first DHCP packet from the virtual machine, wherein the first DHCP packet comprises a first field that includes the second MAC address; replace the second MAC address in the first field with the first MAC address; add the second MAC address to a second field of the first DHCP packet; and provide the first DHCP packet to the DHCP server through the network.

Embodiments may include some or all of the following features. The DHCP server may be adapted to: receive the first DHCP packet; determine that the first DHCP packet is a request for a second IP address for the virtual machine; in response to the determination, assign the second IP address to the virtual machine using the second MAC address, wherein the second IP address is different than the first IP address; generate a second DHCP packet, wherein the second DHCP packet includes the first MAC address in a first field, the second MAC address in a second field, and the second IP address; and provide the second DHCP packet to the host computing device through the network. The host computing device may be further adapted to: receive the second DHCP packet; determine that the second DHCP packet is for the virtual machine; in response to the determination, replace the first MAC address in the first field with the second MAC address; and provide the second DHCP packet to the virtual machine.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an example environment 100 for providing a bridge host extension mode for virtual machines. As shown, the environment 100 includes a DHCP server 120, and a host computing device 140 communicating through a network 190. While only one DHCP server 120 and one host computing device 140 are shown, it is for illustrative purposes only. There are no limits to the number of DHCP servers 120 and host computing devices 140 that may be supported. The DHCP server 120 and host computing device 140 may be implemented using one or more general purpose computing devices such as the computing device 500 illustrated with respect to FIG. 5.

The network 190 may include a plurality of nodes 105 (e.g., the nodes 105A, 105B, and 105C). The nodes 105 may include edge nodes that connect network endpoints to the network 190 and may include wired switches and wireless access points. The nodes 105 may also include border nodes that connect one or more external networks to the network 190. When packets (e.g., DHCP or IP packets) are exchanged between the DHCP server 120 and the host computing device 140 (and other network devices), the packets may pass between one or more nodes 105 of the network 190 depending on their source and destination.

The host computing device 140 may be a wireless host computing device 140 and may be wirelessly connected to the network 190 via a wireless access point. Other types of network connections may be supported.

The host computing device 140 may include a bridge proxy 130 that allows the host computing device 140 to create one or more virtual machines 150 (e.g., the virtual machines 150A, 150B, and 150C) in what is referred to herein as a "bridge host extension mode." In bridge host extension mode, each virtual machine 150 is assigned its own IP address from the DHCP server 120 and MAC address from the bridge proxy 130. However, when packets are sent by a virtual machine 150 to another network device such as the DHCP server 120, the bridge proxy 130 may remove the MAC address from the destination field and replace the MAC address with the MAC address of the host computing device 140. Similarly, when packets are received for a virtual machine 150 by the bridge proxy 130, the bridge proxy 130 may remove the MAC address of the host computing device 140 and replace it with the MAC address of the virtual machine 150 before forwarding it to the virtual machine 150. The specifics of the bridge host extension mode are described further below.

The bridge proxy 130 may facilitate the creation of the virtual machines 150 on the host computing device 140. A virtual machine 150 virtualizes the hardware of the host computing device 140 such that multiple virtual machines 150 may run on the host computing device 140 at a time. Generally, an application called a hypervisor manages the allocations of the resources of the host computing device 140 among the virtual machines 150.

When a virtual machine 150 is first created on the host computing device 140, as part of the onboarding process the user or administrator may select an option to use bridge host extension mode. In response, the bridge proxy 130 may assign the virtual machine 150 a MAC address. Notably, the MAC address assigned to the virtual machine 150 is different than the MAC address of the host computing device 140 and any MAC addresses that are assigned to other virtual machines 150.

The bridge proxy 130 may add the MAC address assigned to the virtual machine 150 to a table 135. The table 135 may include an indication that there is a mapping of the host computing device 140 MAC to a virtual machine 150 MAC address, along with the particular MAC address assigned to each virtual machine 150. There may be an entry for each virtual machine 150 that was created in bridge host extension mode along with an indicator of its assigned MAC address. Any method for generating and assigning MAC addresses may be used. In addition, the bridge proxy 130 may update the table 135 to include an IP address once it is assigned by the DHCP server 120. An example table 135 for the bridge proxy 130 for the virtual machines 150 is shown below.

|          | MAC   | IP   |
|----------|-------|------|
| Host 140 | MAC3  | IP3  |
| VM 150A  | VMAC1 | VIP1 |
| VM 150B  | VMAC2 | VIP2 |
| VM 150C  | VMAC3 | VIP3 |

After the virtual machine 150 is created, the virtual machine 150 may create a DHCP packet to request an IP address from the DHCP server 120. Because the DHCP packet is generated by the virtual machine 150, the DHCP packet will have a source field that includes the MAC address of the virtual machine 150. The virtual machine 150 may then provide or send the generated DHCP packet to the DHCP server 120.

Before the DHCP packet leaves the host computing device 140, the bridge proxy 130 may first replace the MAC address of the virtual machine 150 with the MAC address of the host device 140. In addition, the bridge proxy 130 may add the MAC address of the virtual machine 150 to the DHCP packet in a field such as the CHADDR field, or in the DHCP options field. Other fields may be used. Further, the bridge proxy 130 may set an indicator, such as a bit or flag, in the DHCP packet to indicate to the DHCP server 120 that the bridge host extension mode is being used. The bridge proxy 130 may then allow the DHCP packet to be proved to the DHCP server 120 through the network 190.

The DHCP server 120 may receive the DHCP packet through the network. In order for the bridge host extension mode described herein to work, some security measures typically implemented by DHCP servers 120 must be relaxed. First, the DHCP server 120 may be allowed to assign multiple IP addresses to MAC addresses. Second, the DHCP server 120 may be allowed to accept packets sent from the host computing device 140 (i.e., have the MAC address of the host computing device) even though they were generated by a different client (i.e., the virtual machine 150).

The DHCP server 120 may receive the DHCP packet and may determine that the DHCP packet is associated with the bridge host extension mode. Depending on the embodiment, the DHCP server 120 may make the determination based on the MAC address in the CHADDR field or some other indicator that the DHCP packet is associated with the bridge host extension mode.

The DHCP server 120 may extract the MAC address of the virtual machine 150 from the DHCP packet and may assign the virtual machine 150 an IP address. The IP address may be different than the IP address assigned to the host computing device 140 (or the other virtual machines 150). The DHCP server 120 may then store the mapping of MAC address to IP address in a table 125. An example table 125 for the bridge proxy 130 for the DHCP server 120 is shown below.

|          | MAC   | IP   |
|----------|-------|------|
| Host 140 | MAC3  | IP3  |
| VM 150A  | VMAC1 | VIP1 |
| VM 150B  | VMAC2 | VIP2 |
| VM 150C  | VMAC3 | VIP3 |

In some embodiments, each host computing device 140 may be associated with its own table 125 at the DHCP server 120. The table 125 may be a binding of virtual machine 150 MAC addresses and IP addresses to host computing device 140 MAC addresses and IP addresses. These bindings may be used, among other things, for tracking, policing, profiling, and client roam scenarios.

The DHCP server 120, after assigning the virtual machine 150 an IP address and updating the table 125, may generate another DHCP packet that informs the virtual machine 150 of the IP address that was assigned to it. However, rather than use the MAC address of the virtual machine 150 in the destination field of the DHCP packet, the DHCP server 120 may use the MAC address of the host computing device 140. In addition, the DHCP server 120 may insert the MAC address of the virtual machine 150 into the CHADDR field and may add an indicator of the bridge host extension mode into the DHCP packet. The DHCP server 120 may then send the DHCP packet to the host computing device 140.

The host computing device 140 may receive the DHCP packet, and the bridge proxy 130 may determine that the DHCP packet is for the virtual machine 150 even though the destination field includes the MAC address of the host computing device 140. In some embodiments, the bridge proxy 130 may make the determination based on the presence of the MAC address of the virtual machine 150 in the DHCP packet, and/or the identifier of the bridge host extension mode in the DHCP packet.

In response to determining that the DHCP packet is for the virtual machine 150, the bridge proxy 130 may replace the destination field in the DHCP packet with the MAC address of the virtual machine 150 and may forward the DHCP packet to the virtual machine 150. In addition, the bridge proxy 130 may record the IP address assigned to the virtual machine 150 in the table 135.

After the virtual machine 150 receives the IP address, any packets (e.g., DHCP packets, ARP packets, and IP packets) sent by the virtual machine 150 are intercepted by the bridge proxy 130, which may replace the MAC address of the virtual machine 150 in the destination field of the packet with the MAC address of the host computing device 140. The bridge proxy 130 may then provide the packet to the network 190 and the packet may be routed to the destination indicated in the destination field of the packet.

Similarly, when a packet is received by the host computing device 140, the bridge proxy 130 may determine that the packet is directed to a virtual machine 150. For example, the bridge proxy 130 may determine that the packet is directed to an IP address associated with a virtual machine 150 using the table 135. In response, the bridge proxy 130 may replace the MAC address of the host computing device 140 in the destination field with the MAC address of the virtual machine 150.

As mentioned above, the table 125 maintained by the DHCP server 120 may further allow for profiling, tracking, policing, and client roam scenarios. For example, with respect to client profiling, the table 125 associated with each host computing device 140 stored by the HDCP server 120 may be used to create a profile about each client (e.g., virtual machine 150) that includes its IP address, MAC address, and the IP address and MAC address of the host computing device 140. This may allow a user or administrator to get a complete view of the virtual machines 150 that are associated with their network 190 and which host computing devices 140 that they are executed on.

Wither respect to client roam scenarios and client tracking, when the host computing device 140 roams and connects to the network 190 with a new Wi-Fi access point, the table 135 associated with the host computing device 140 may be provided by the DHCP server 120 and may be used to determine the IP addresses of each virtual machine 150 that is now connected to the new Wi-Fi access point. Alternatively, the table 125 may be provided by the host computing device 140 and may be used to make the determination.

With respect to policing (e.g., traffic policing), the table 125 or table 135 may be used to determine which host computing devices 140 are hosting a particular virtual machine 150. Any traffic restrictions associated with the particular virtual machine can be enforced on packets to the corresponding host computing device 140 as described in the table 125 or 135.

Figure 2:
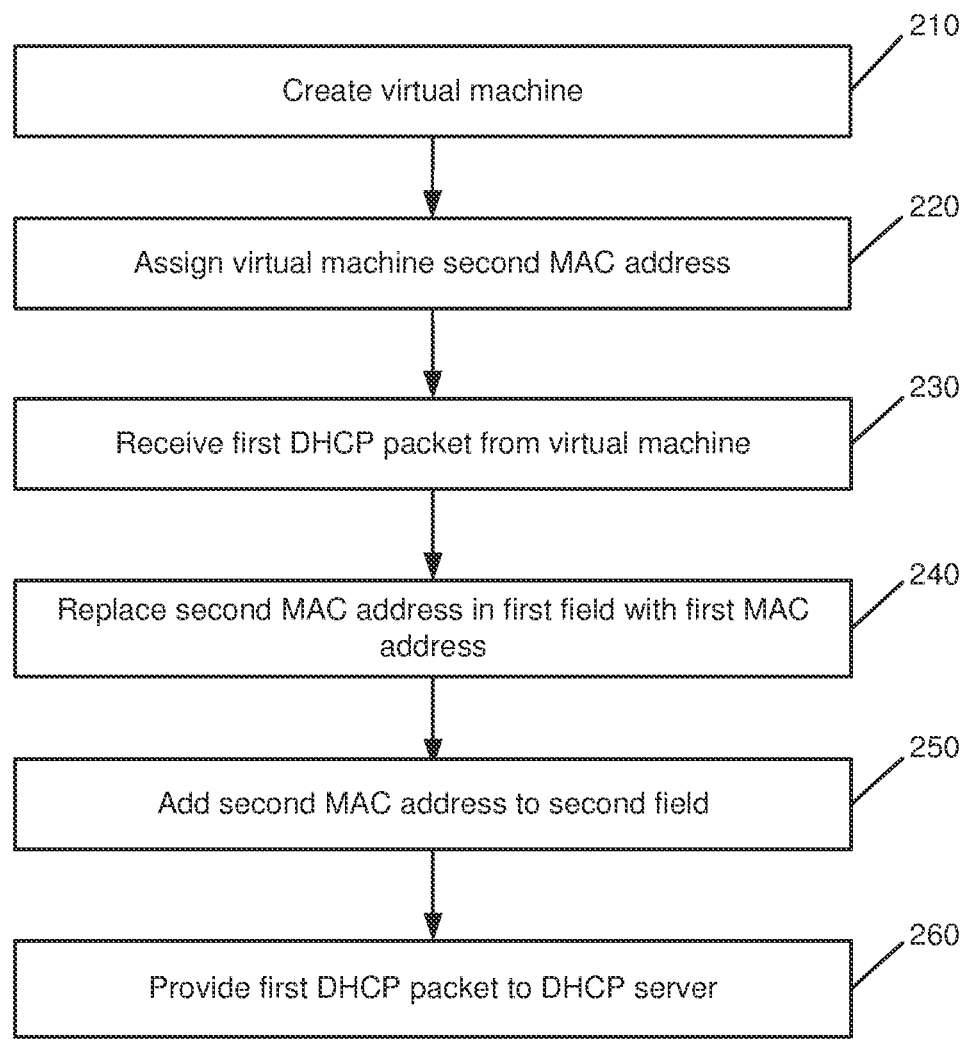
FIG. 2 is an operational flow of an implementation of a method for onboarding a virtual machine using a bridge host extension mode by a host computing device.

FIG. 2 is an operational flow of an implementation of a method 200 for onboarding a virtual machine using a bridge host extension mode. The method 200 may be implemented by a host computing device 140.

At 210, a virtual machine is created. The virtual machine 150 may be created by the host computing device 140. The host computing device 140 may have a first MAC address and a first IP address. For example, a user or administrator may create the virtual machine 150 on the host computing device 140. As part of creating the virtual machine 150, the user or administrator may select an option for the virtual machine 150 to be configured in a bridge host extension mode. Any method for creating a virtual machine may be used.

At 220, a second MAC address is assigned to the virtual machine. The second MAC address may be assigned to the virtual machine 150 by the host computing device 140. The second MAC address may be different than the first MAC address associated with the host computing device 140. Each virtual machine 150 executing on the host computing device 140 may be associated a unique MAC address. A mapping of virtual machine MAC addresses to virtual machines 150 may be stored and maintained by the host computing device 140 as the table 135.

At 230, a first DHCP packet is received. The first DHCP packet may be received from the virtual machine by a bridge proxy executing on the host computing device 140. The first DHCP packet may be a request to receive a second IP address from the DHCP server 120. The first DHCP packet may include the second MAC address assigned to the virtual machine 150 in a source field. The first DHCP packet may have been intercepted by the bridge proxy 130 on its way to the DHCP server 120.

At 240, the second MAC address is replaced with the first MAC address in the first DHCP packet. The second MAC address may be replaced by the first MAC address by the bridge proxy 130. In particular, the bridge proxy 130 may replace the second MAC address in the destination field of the first DHCP packet with the first MAC address.

At 250, the second MAC address is added to the first DHCP packet. The second MAC address of the virtual machine 150 may be added to the first DHCP packet by the bridge proxy 130. In some embodiments, the bridge proxy 130 may add the second MAC to a field of the first DHCP packet such as the CHADDR field. Other fields may be used. In addition, the bridge proxy 130 may set a particular bit or flag in the first DHCP packet that identifies it as being related to the bridge host extension mode.

At 260, the first DHCP packet is provided to the DHCP server. The first DHCP packet may be provided to the DHCP server 120 through the network 190. For example, the bridge proxy 130 of the host computing device 140 may provide the DHCP packet to a node 105 of the network 190 and the DHCP packet may be routed to the DHCP server 120.

Figure 3:
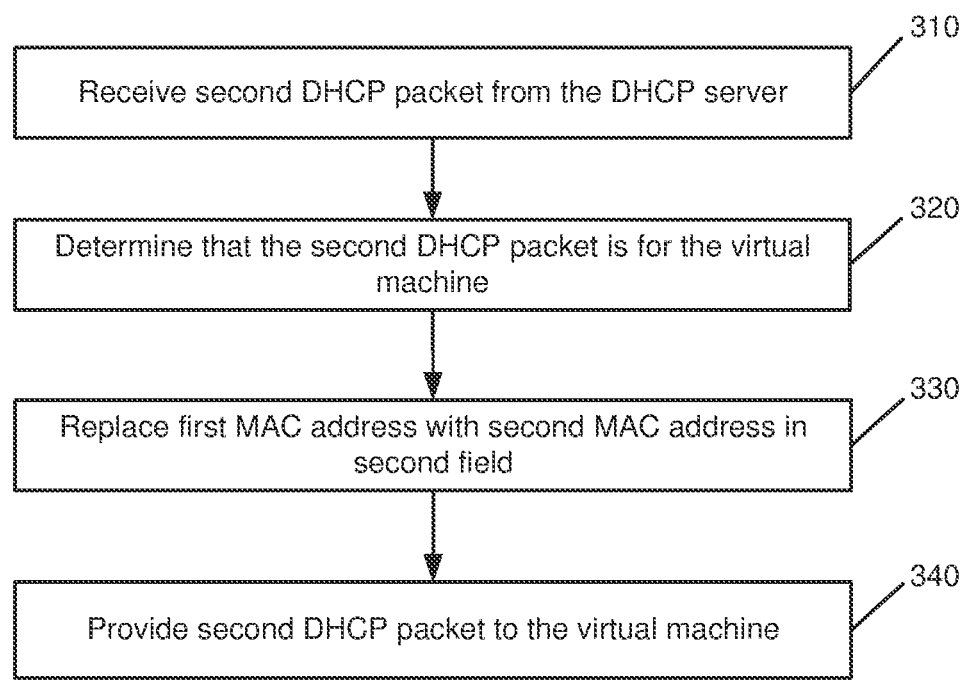
FIG. 3 is an operational flow of an implementation of a method for onboarding a virtual machine using a bridge host extension mode by a host computing device.

FIG. 3 is an operational flow of an implementation of a method 300 for onboarding a virtual machine using a bridge host extension mode. The method 300 may be implemented by a host computing device 140.

At 310, a second DHCP packet is received. The second DHCP packet may be received by the host computing device 140. The second DHCP packet may have been generated in response to the first DHCP packet and may include an IP address for the virtual machine 130 to use. The second DHCP packet, even though intended for the virtual machine 150, may have the first MAC address of the host computing device 140 in the destination field of the second DHCP packet. The second MAC address of the virtual machine 150 may be in a different field of the second DHCP packet such as the CHADDR field.

At 320, that the second DHCP packet is for the virtual machine is determined. The determination may be made by the bridge proxy 130 of the host computing device 140. In some embodiments, the bridge proxy 130 may determine that the second DHCP packet is for the virtual machine 150 based on the presence of the second MAC address in the CHADDR field and/or the presence of a bit or flag in the second DHCP packet that indicates that it is associated with the bridge host extension mode.

At 330, the first MAC address is replaced with the second MAC address. The first MAC address may be replaced with the second MAC address in the destination field of the second DHCP packet by the bridge proxy 130.

At 340, the second DHCP packet is provided to the virtual machine. The second DHCP packet may be provided to the virtual machine 150 by the bridge proxy 130.

Figure 4:
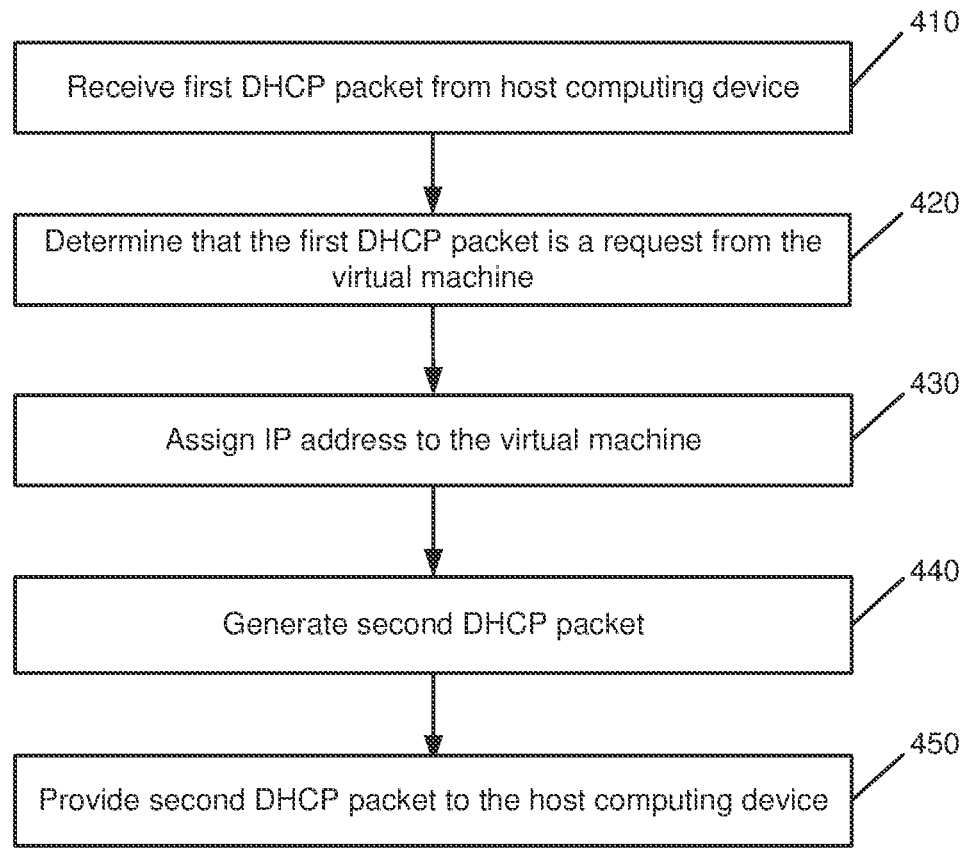
FIG. 4 is an operational flow of an implementation of a method for onboarding a virtual machine using a bridge host extension mode by a DHCP server.

FIG. 4 is an operational flow of an implementation of a method 400 for onboarding a virtual machine using a bridge host extension mode. The method 400 may be implemented by a DHCP server 120.

At 410, a first DHCP packet is received. The first DHCP packet may be received by the DHCP server 120 from the host computing device 140. The first DHCP packet may be a request for an IP address from a virtual machine 150 executing on the host computing device 140. The host computing device 140 may have a first MAC address and the virtual machine 150 may have a second MAC address. Although the first DHCP packet originated from the virtual machine 150, the bridge proxy 130 of the host computing device 140 replaced the second MAC address in the destination field with the first MAC address. The bridge proxy 130 may have also inserted the second MAC address into the CHADDR field of the first DHCP packet.

At 420, that the first DHCP packet is a request from the virtual machine is determined. The determination may be made by the DHCP server 120 based on the presence of the second MAC address in the CHADDR field or the presence of a flag or bit in the DHCP packet that indicates that the virtual machine 150 was set up in the bridge host extension mode.

At 430, an IP address is assigned to the virtual machine. The IP address may be assigned to the virtual machine 150 by the DHCP sever 120. The DHCP server 120 may store the assignment of the IP address to the second MAC address in the table 125. The IP address assigned to the virtual machine 150 (i.e., the second MAC address) may be different than the IP address assigned to the host computing device 140 that executes the virtual machine 150.

At 440, a second DHCP packet is generated. The second DHCP packet may be generated by the DHCP server 120. The second DHCP packet may include the IP address assigned to the virtual machine 150. The second DHCP packet may have the first MAC address of the host computing device 140 in the destination field even though the second DHCP packet is for the virtual machine 150. The second DHCP packet may have the second MAC address of the virtual machine 150 in the CHADDR field.

At 450, the second DHCP packet is provided to the host computing device. The second DHCP packet may be provided by the DHCP server 120.

Figure 5:
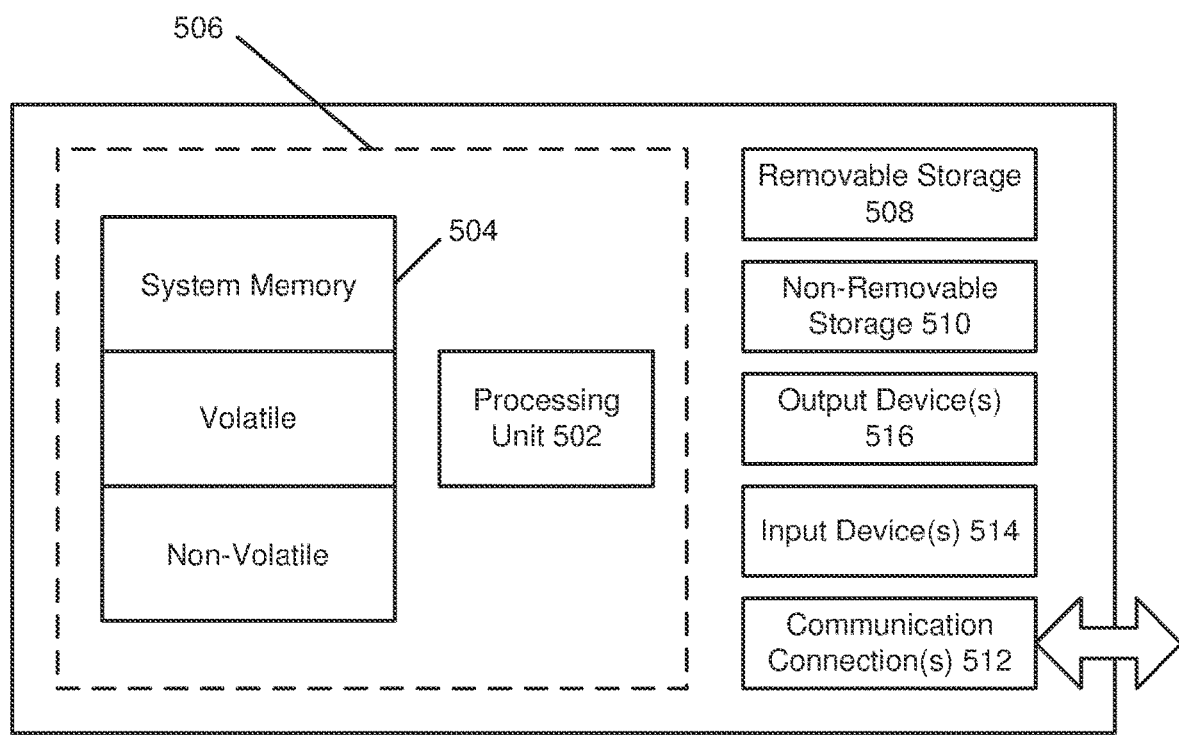
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for onboarding a virtual machine in a bridge host extension mode comprising:
    creating a virtual machine on a host computing device, wherein the host computing device is associated with a first MAC address and a first IP address;
    assigning the virtual machine a second MAC address by the host computing device, wherein the second MAC address is different than the first MAC address and is unique to the virtual machine;
    receiving a first DHCP packet from the virtual machine by the host computing device, wherein the first DHCP packet comprises a first field that includes the second MAC address;
    replacing the second MAC address in the first field with the first MAC address by the host computing device;
    adding the second MAC address to a second field of the first DHCP packet by the host computing device; and
    providing the first DHCP packet to a DHCP server through a network by the host computing device, wherein the DHCP server stores the first and second MAC addresses and uses the stored first and second MAC addresses to profile the virtual machine.

2. The method of claim 1, further comprising:
    receiving a second DHCP packet from the DHCP server through the network by the host computing device, wherein the second DHCP packet includes a first field with the first MAC address and a second field with the second MAC address;
    determining that the second DHCP packet is for the virtual machine by the host computing device;
    in response to the determination, replacing the first MAC address in the first field with the second MAC address by the host computing device; and
    providing the second DHCP packet to the virtual machine by the host computing device.

3. The method of claim 2, wherein the second DHCP packet comprises a second IP address for the virtual machine, wherein the second IP address is different than the first IP address.

4. The method of claim 2, wherein determining that the second DHCP packet is for the virtual machine comprises detecting the second MAC address in the second field.

5. The method of claim 2, wherein the second DHCP includes an identifier of a bridge host extension mode and determining that the second DHCP packet is for the virtual machine comprises detecting the identifier of the bridge host extension mode.

6. The method of claim 1, wherein the network comprises a plurality of edge nodes.

7. The method of claim 1, wherein the first field is a destination MAC field.

8. The method of claim 1, wherein the second field is a CHADDR field.

9. A method for onboarding a virtual machine in a bridge host extension mode comprising:
    receiving a first DHCP packet by a DHCP server from a host computing device through a network, wherein the first DHCP packet comprises a first field that includes a first MAC address of the host computing device and a second MAC address of a virtual machine, and wherein the first MAC address and the second MAC address are different;
    determining that the first DHCP packet is a request for a first IP address for the virtual machine by the DHCP server;
    in response to the determination, assigning the first IP address to the virtual machine using the second MAC address, wherein the first IP address is different than a second IP address assigned to the host computing device using the first MAC address;
    generating a second DHCP packet by the DHCP server, wherein the second DHCP packet includes the first MAC address in a first field, the second MAC address in a second field, and the first IP address;
    providing the second DHCP packet to the host computing device by the DHCP server through the network;
    storing the first and second MAC addresses by the DHCP server;
    using the stored first and second MAC addresses to profile the virtual machine by the DHCP server.

10. The method of claim 9, further comprising:
    receiving the second DHCP packet by the host computing device;
    determining that the second DHCP packet is for the virtual machine by the host computing device;
    in response to the determination, replacing the first MAC address in the first field with the second MAC address by the host computing device; and
    providing the second DHCP packet to the virtual machine by the host computing device.

11. The method of claim 9, wherein determining that the second DHCP packet is for the virtual machine comprises detecting the second MAC address in the second field.

12. The method of claim 9, wherein the second DHCP includes an identifier of a bridge host extension mode and determining that the second DHCP packet is for the virtual machine comprises detecting the identifier of the bridge host extension mode.

13. The method of claim 9, wherein the network comprises a plurality of edge nodes.

14. The method of claim 9, wherein the first field is a destination MAC field.

15. The method of claim 9, wherein the second field is a CHADDR field.

16. A system for onboarding a virtual machine in a bridge host extension mode comprising:
- a network comprising a plurality of edge nodes;
- a DHCP server; and
- a host computing device, wherein the host computing device is adapted to:
  - create a virtual machine, wherein the host computing device is associated with a first MAC address and a first IP address;
  - assign the virtual machine a second MAC address, wherein the second MAC address is different than the first MAC address and is unique to the virtual machine;
  - receive a first DHCP packet from the virtual machine, wherein the first DHCP packet comprises a first field that includes the second MAC address;
  - replace the second MAC address in the first field with the first MAC address;
  - add the second MAC address to a second field of the first DHCP packet; and
  - provide the first DHCP packet to the DHCP server through the network, wherein the DHCP server is adapted to:
- receive the first DHCP packet;
- store the first and second MAC address; and
- use the stored first and second MAC addresses to profile the virtual machine.

17. The system of claim 16, wherein the DHCP server is adapted to:
- determine that the first DHCP packet is a request for a second IP address for the virtual machine;
- in response to the determination, assign the second IP address to the virtual machine using the second MAC address, wherein the second IP address is different than the first IP address;
- generate a second DHCP packet, wherein the second DHCP packet includes the first MAC address in a first field, the second MAC address in a second field, and the second IP address; and
- provide the second DHCP packet to the host computing device through the network.

18. The system of claim 17, wherein the host computing device is further adapted to:
- receive the second DHCP packet;
- determine that the second DHCP packet is for the virtual machine;
- in response to the determination, replace the first MAC address in the first field with the second MAC address; and
- provide the second DHCP packet to the virtual machine.

* * * * *